US009408139B1

(12) United States Patent
Chang et al.

(10) Patent No.: US 9,408,139 B1
(45) Date of Patent: Aug. 2, 2016

(54) MULTI-RAT MOBILE COMMUNICATION DEVICES AND METHODS FOR NETWORK SELECTION

(71) Applicant: MediaTek Inc., Hsin-Chu (TW)

(72) Inventors: Chi-Ju Chang, Taipei (TW); Tao-Sheng Ou, Taoyuan (TW); Yu-Ting Chen, Meishan Township, Chiayi County (TW); Yen-Ku Liu, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/711,028

(22) Filed: May 13, 2015

Related U.S. Application Data

(60) Provisional application No. 62/108,156, filed on Jan. 27, 2015.

(51) Int. Cl.
*H04W 48/16* (2009.01)
*H04W 48/18* (2009.01)
*H04W 88/06* (2009.01)

(52) U.S. Cl.
CPC ............. *H04W 48/18* (2013.01); *H04W 88/06* (2013.01)

(58) Field of Classification Search
CPC .................................................... H04W 48/16
USPC .............................................. 455/434–435.2
See application file for complete search history.

(56) References Cited

U.S. PATENT DOCUMENTS

| 8,560,008 | B2 | 10/2013 | Islam et al. | |
|---|---|---|---|---|
| 2008/0153486 | A1 | 6/2008 | Ramkull et al. | |
| 2014/0066061 | A1* | 3/2014 | Lou ........................ | H04W 48/16 455/434 |
| 2015/0004966 | A1 | 1/2015 | Ayleni et al. | |
| 2015/0140948 | A1* | 5/2015 | Tiwari ..................... | H04W 4/22 455/404.1 |

FOREIGN PATENT DOCUMENTS

EP          2 389 037       11/2011
WO     WO 2008/052123       5/2008

OTHER PUBLICATIONS

3rd Generation Partnership Project; Technical Specification Group Core Network and Terminals; Non-Access-Stratum (NAS) functions related to Mobile Station (MS) in idle mode; (Release 8); Sep. 2009; pp. 1-39.
Jarvis, A.; "Out of service in 3G Idle mode and Ping Pong;" TSG-SA NSP Workshop; Jan. 2006; pp. 1-4.

* cited by examiner

*Primary Examiner* — Michael T Vu
(74) *Attorney, Agent, or Firm* — McClure, Qualey & Rodack, LLP

(57) ABSTRACT

A mobile communication device supporting a plurality of Radio Access Technologies (RATs) and a plurality of radio frequencies is provided. In the mobile communication device, a Baseband processor is configured to schedule the plurality of RATs and the plurality of radio frequencies in pairs in an order for a Public Land Mobile Network (PLMN) selection procedure, and determine one of the pairs and repeat the determined pair in the order of the pairs during the PLMN selection procedure.

10 Claims, 5 Drawing Sheets

MULTI-RAT MOBILE COMMUNICATION DEVICES AND METHODS FOR NETWORK SELECTION

CROSS REFERENCE TO RELATED APPLICATIONS

This application claims priority of U.S. Provisional Application No. 62/108,156, filed on Jan. 27, 2015, the entirety of which is incorporated by reference herein.

BACKGROUND OF THE INVENTION

1. Field of the Invention

The invention generally relates to wireless communication technologies, and more particularly, to methods for network selection by mobile communication devices supporting a plurality of Radio Access Technologies (RATs) and a plurality of radio frequencies.

2. Description of the Related Art

With growing demand for ubiquitous computing and networking, various Radio Access Technologies (RATs) have been developed, such as the Global System for Mobile communications (GSM) technology, General Packet Radio Service (GPRS) technology, Enhanced Data rates for Global Evolution (EDGE) technology, Wideband Code Division Multiple Access (W-CDMA) technology, High Speed Packet Access (HSPA) technology, Interim Standard 95 (IS-95) technology, Code Division Multiple Access 2000 (CDMA2000) technology, CDMA2000 1× Evolution-Data Optimized or Evolution-Data (1× EV-DO) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, LTE-Advanced (LTE-A) technology, and others.

Generally, a mobile phone only supports one RAT for providing users with the flexibility of mobile communications at all times via the supported RAT. However, due to the complexity of various network deployments, so-called multi-RAT mobile phones have been developed, which generally support two or more RATs and radio frequencies, and select one of the RATs for obtaining mobile services. Since multi-RAT mobile phones support multiple RATs and radio frequencies, the Public Land Mobile Network (PLMN) selection procedure will inevitably take a long time to complete a full scan for all of the supported RATs on each supported radio frequency. This may create an unfavorable situation where a multi-RAT mobile phone enters an area with very poor signal quality only for a short time (e.g., passing through a tunnel). For example, once the multi-RAT mobile phone detects that the signal coverage has been lost, the PLMN selection procedure will be performed for a full scan. Later, even if the multi-RAT mobile phone swiftly enters an area with signal coverage of those that have been scanned in the early stage of the full scan, it will still continue the full scan with the un-scanned RATs and radio frequencies and cannot regain normal services from the available area using the scanned RAT and radio frequency. The delay for regaining normal services is expected to get worse especially when the number of supported RATs and radio frequencies increases, and the longer the delay is, the higher the chance of a service breakup (e.g., TCP/IP-based application).

Therefore, it is desirable to have a more sophisticated way of network selection that can reduce the time to obtain/regain normal services.

BRIEF SUMMARY OF THE INVENTION

In one aspect of the invention, a mobile communication device supporting a plurality of RATs and a plurality of radio frequencies is provided. The mobile communication device comprises a Baseband processor which is configured to schedule a plurality of RATs and a plurality of radio frequencies in pairs in an order for a Public Land Mobile Network (PLMN) selection procedure, and determine one of the pairs and repeat the determined pair in the order of the pairs during the PLMN selection procedure.

In another aspect of the invention, a method for network selection by a mobile communication device supporting a plurality of RATs and a plurality of radio frequencies is provided. The method comprises the steps of: scheduling the plurality of RATs and the plurality of radio frequencies in pairs in an order for a PLMN selection procedure; and determining one of the pairs and repeating the determined pair in the order of the pairs during the PLMN selection procedure.

Other aspects and features of the present invention will become apparent to those with ordinarily skill in the art upon review of the following descriptions of specific embodiments of the mobile communication devices and the methods for network selection.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
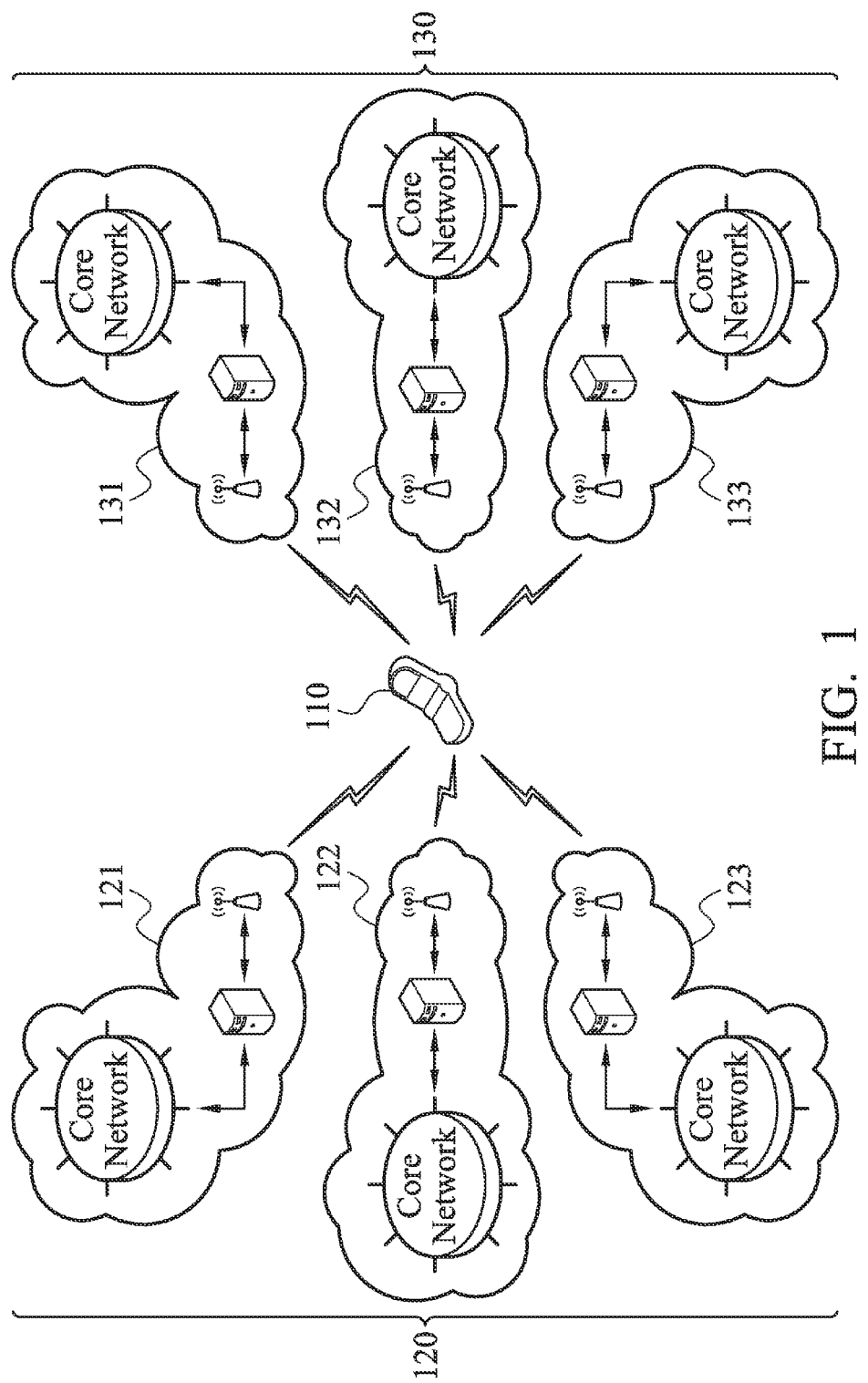
FIG. 1 is a block diagram illustrating a wireless communications environment according to an embodiment of the invention.

FIG. 1 is a block diagram illustrating a wireless communications environment according to an embodiment of the invention. The wireless communications environment 100 comprises a mobile communication device 110, and a plurality of service networks 121~123 and 131~133, wherein the service networks 121~123 belong to the PLMN 120, and the service networks 131~133 belong to the PLMN 130. That is, the service networks 121~123 are deployed by one operator, and the service networks 131~133 are deployed by another operator. Each of the service networks 121~123 supports a respective RAT in one or more particular radio frequencies. Likewise, each of the service networks 131~133 supports a respective RAT in one or more particular radio frequencies. Specifically, the service network 121 is a GSM network, the service network 122 is a WCDMA network, and the service network 123 is an LTE network. The service network 131 is an IS-95 network, the service network 132 is a CDMA2000 network, and the service network 133 is a TD-LTE network.

The mobile communication device 110 supports a plurality of RATs and radio frequencies, including the RATs and radio frequencies utilized by the service networks 121~123 and 131~133. The mobile communication device 110 may wirelessly communicate with one of the service networks 121~123 and 131~133 for obtaining mobile services, including Circuit-Switched (CS) and/or Packet-Switched (PS) services, wherein the CS services may include voice call services, and Short Message Service (SMS), etc., and the PS services may include data services, such as e-mail transmission, web browsing, file upload/download, instant messaging, streaming video, or others. For example, the mobile communication device 110 may be a multi-RAT mobile device, such as a mobile phone, panel PC, or notebook PC, etc. Alternatively, the mobile communication device 110 may be an external data card for a computer host, notebook, or panel PC to obtain mobile services.

Figure 2:
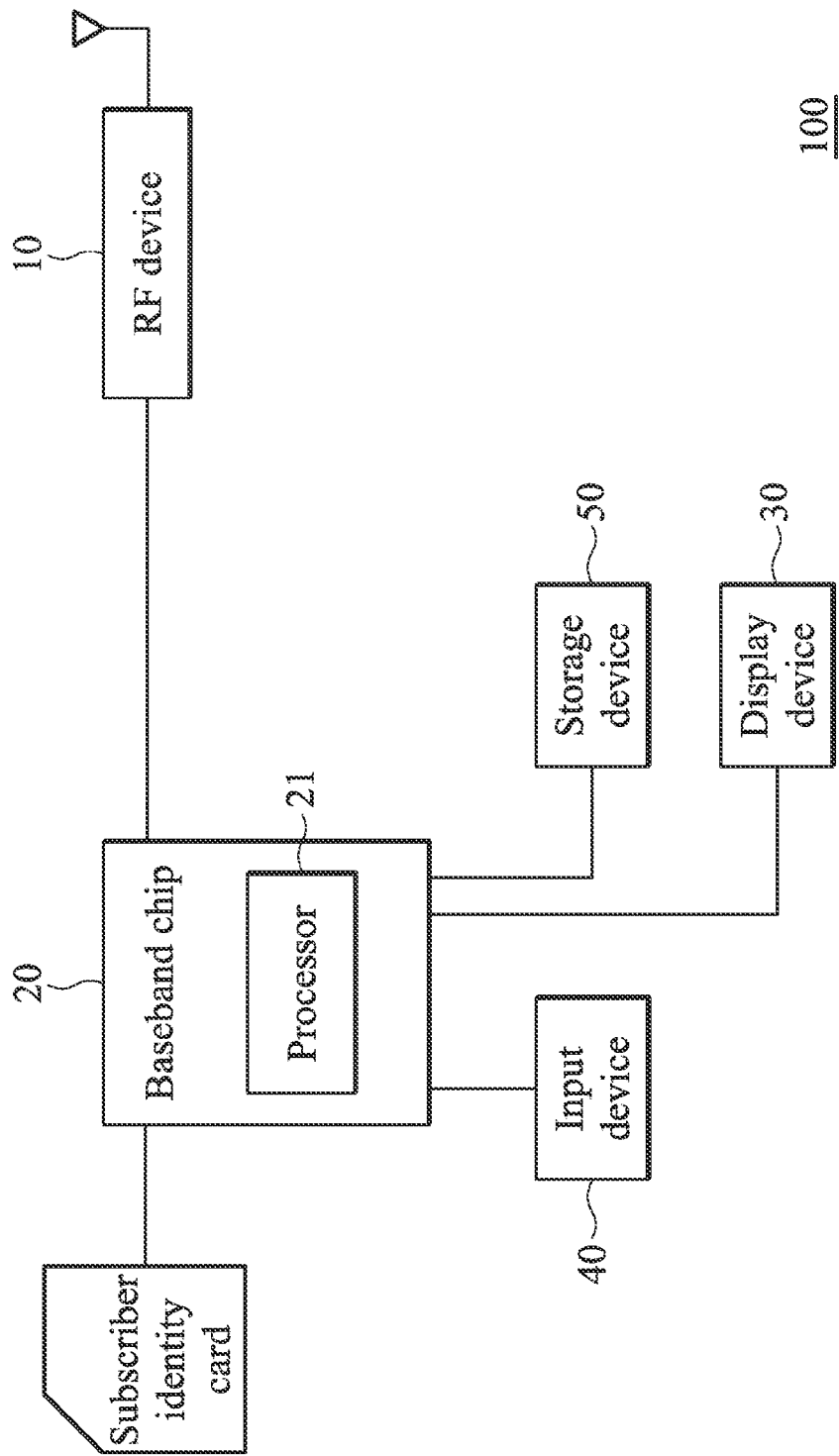
FIG. 2 is a block diagram illustrating the mobile communication device 110 according to an embodiment of the invention.

FIG. 2 is a block diagram illustrating the mobile communication device 110 according to an embodiment of the invention. The mobile communication device 110 comprises a Radio Frequency (RF) device 10, a Baseband chip 20, a display device 30, an input device 40, and a storage device 50, wherein the RF device 10, the display device 30, the input device 40, and the storage device 50 are coupled to the Baseband chip 20. The Baseband chip 20 comprises a processor 21, such as a Micro-Control Unit (MCU), Digital Signal Processor (DSP), or the like, for controlling the communications between the subscriber identity card and the RF device 10, sending a series of frame data (e.g. representing text messages, graphics, images or others) to the display device 30, receiving signals from the input device 40, and storing and retrieving data to and from the storage device 50. Most importantly, the processor 21 coordinates the aforementioned operations of the RF device 10, the display device 30, the input device 40, and the storage device 50 for performing the method for network selection.

The subscriber identity card may be provided in compliance with the specification of one or more of the RATs utilized by the service networks 121~123 and 131~133, and is used to store a frequency list (which may also be referred to as a stored list of frequencies), and subscriber information, including subscriber information and preset PLMNs (such as Registered PLMN (RPLMN), Home PLMN (HPLMN), and Equivalent PLMN (EPLMN)). For example, the subscriber identity card may be a Subscriber Identity Module (SIM) card for the service network 121 being a GSM network or the service network 122 being a WCDMA network, or the subscriber identity card may be a Universal SIM (USIM) card for the service network 122 being a WCDMA network or the service network 123 being an LTE network, or the subscriber identity card may be a User Identity Module (UIM) for the service network 131 being an IS-95 network, or the subscriber identity card may be a Removable UIM (RUIM) for the service network 132 being a CDMA2000 network. Alternatively, the mobile communication device 110 may need more than one subscriber identity card or the subscriber identity card is a dual-mode subscriber identity card, for holding more than one set of stored information and subscriber information, which allows the mobile communication device 110 to wirelessly communicate with more than one of the service networks 121~123 and 131~133 at the same time.

In one embodiment, the Baseband chip 20 may further comprise one interface (not shown) to handle the connection to the subscriber identity card. In another embodiment, the mobile communication device 110 may further comprise a card controller (not shown) coupled or connected between the Baseband chip 20 and the subscriber identity card. The card controller is responsible for powering the subscriber identity card with a voltage level according to the requirements thereof by a Power Management Integrated Chip (PMIC) and a battery, wherein the voltage level for the subscriber identity card is determined during initiation. The Baseband chip 20 may read/write data from/to the subscriber identity card via the card controller. In addition, the card controller selectively transfers clocks, resets, and/or data signals to the subscriber identity card according to instructions issued by the Baseband chip 20. Alternatively, the stored information and subscriber information may be written directly into the mobile communication device 110, without the need for any socket to insert any subscriber identity card, or the stored and subscriber information may be provided by a virtual subscriber identity card stored in the storage device 50, and the invention is not limited thereto.

Additionally, the Baseband chip 20 may further contain other hardware components to perform baseband signal processing, including Analog-to-Digital Conversion (ADC)/Digital-to-Analog Conversion (DAC), gain adjusting, modulation/demodulation, encoding/decoding, and so on. The RF device 10 may receive RF wireless signals via the antenna, convert the received RF wireless signals to baseband signals, which are processed by the Baseband chip 20, or receive baseband signals from the Baseband chip 20 and convert the received baseband signals to RF wireless signals, which are later transmitted via the antenna. The RF device 10 may also contain multiple hardware devices to perform radio frequency conversion. For example, the RF device 10 may comprise a mixer to multiply the baseband signals with a carrier oscillated in the radio frequency of the supported RATs, wherein the radio frequency may be 900 MHz, 1800 MHz or 1900 MHz utilized in GSM/GPRS/EDGE technology, or may be 900 MHz, 1900 MHz or 2100 MHz utilized in WCDMA technology, or may be 900 MHz, 2100 MHz, or 2.6 GHz utilized in LTE/LTE-A/TD-LTE technology, or others, depending on the RAT in use.

The display device 30 may be a Liquid-Crystal Display (LCD), Light-Emitting Diode (LED) display, or Electronic Paper Display (EPD), etc., for providing a display function. Alternatively, the display device 30 may further comprise one or more touch sensors disposed thereon or thereunder for sensing touches, contacts, or approximations of objects, such as fingers or styluses.

The input device 40 may comprise one or more buttons, a keyboard, a mouse, a touch pad, a video camera, a microphone, and/or a speaker, etc., serving as the Man-Machine Interface (MMI) for interaction with users.

The storage device 50 may be a memory, such as a FLASH memory or a Non-volatile Random Access Memory (NVRAM), or a magnetic storage device, such as a hard disk or a magnetic tape, or an optical disc, or any combination thereof for storing communication data for the Baseband chip 20 and/or storing subscriber data read from the subscriber identity card.

It should be understood that the components described in the embodiment of FIG. 2 are for illustrative purposes only and are not intended to limit the scope of the present application.

Figure 3:
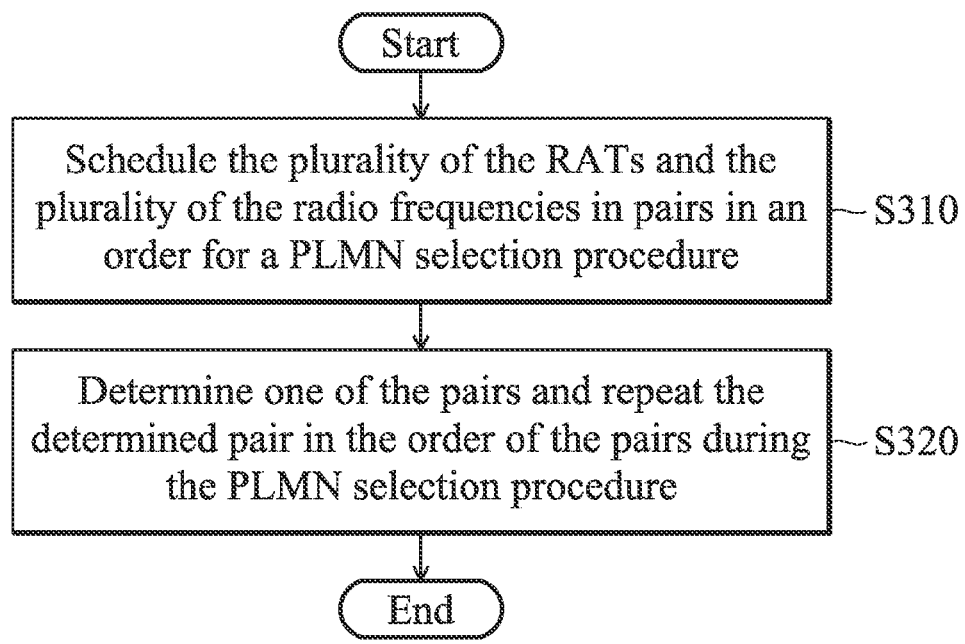
FIG. 3 is a flow chart illustrating the method for network selection by a mobile communication device according to an embodiment of the invention.

FIG. 3 is a flow chart illustrating the method for network selection by a mobile communication device according to an embodiment of the invention. In this embodiment, the mobile communication device is a multi-RAT mobile phone which supports a plurality of RATs and radio frequencies. To begin, the mobile communication device schedules the plurality of RATs and the plurality of radio frequencies in pairs in an order for a PLMN selection procedure (step S310). Specifically, the PLMN selection procedure is initiated in response to a power-on of the mobile communication device or in response to the mobile communication device being out of service.

Subsequently, the mobile communication device determines one of the pairs and repeats the determined pair in the order of the pairs during the PLMN selection procedure (step S320). Specifically, the determined pair is determined according to one of the following features of each of the pairs: 1) whether a RAT and a radio frequency of a pair is a serving RAT and a serving frequency; 2) whether a RAT and a radio frequency of a pair appears in neighbor information from a System Information Broadcast (SIB) or measurement configuration; 3) whether a RAT and a radio frequency of a pair appears in a frequency list from a subscriber identity card coupled in or to the mobile communication device; and 4) a priority level of a PLMN to which a RAT and a radio frequency of a pair belong. For example, each pair may be assigned a weighting value according to the features mentioned above, and the pairs are scheduled in the order of their corresponding weighting values, wherein the pair with a weighting value greater than a predetermined threshold may be determined to be repeated.

In one embodiment, the determined pair is repeated during the PLMN selection procedure when a predetermined number of the other pairs have been scanned. For example, the mobile communication device may use a counter to count the number of pairs that have been scanned since the last repeat of the determined pair, and repeat the determined pair when the counter reaches the predetermined number. In another embodiment, the determined pair is repeated during the PLMN selection procedure when a predetermined period of time has elapsed since the last repeat of the determined pair. For example, the mobile communication device may use a timer to count the predetermined period of time from the last repeat of the determined pair, and repeat the determined pair when the timer expires.

Figure 4:
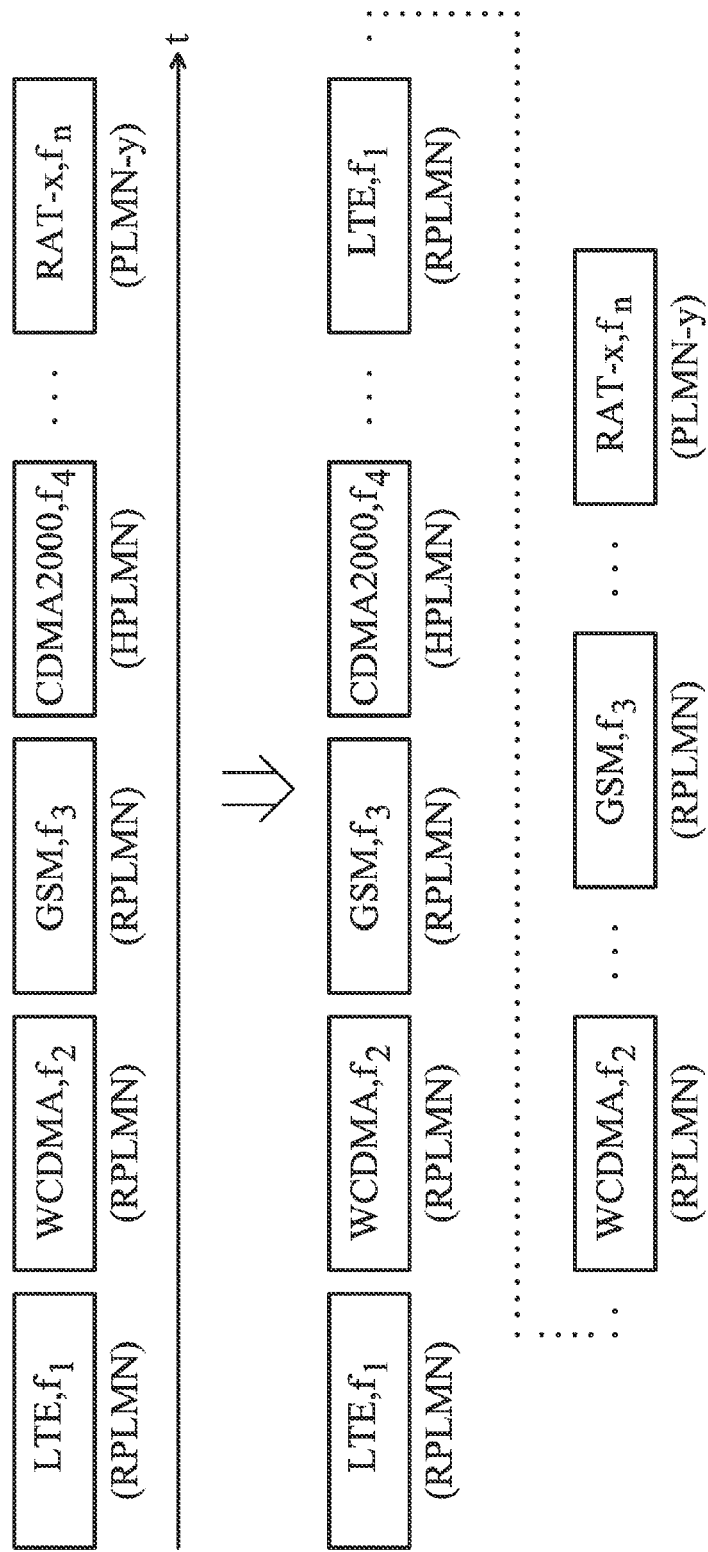
FIG. 4 is a schematic diagram illustrating the scheduling list of pairs of RATs and radio frequencies with more than one repeated pair according to an embodiment of the invention.

FIG. 4 is a schematic diagram illustrating the scheduling list of pairs of RATs and radio frequencies with more than one repeated pair according to an embodiment of the invention. As shown in the upper half of FIG. 4, the supported RATs and radio frequencies are paired up and scheduled from left to right according to the priority levels of their corresponding PLMNs. In another embodiment, the pairs of RATs and radio frequencies may be scheduled according to other features of the pairs as described in the embodiment of FIG. 3. Specifically, the mobile communication device may maintain a prioritized list of the PLMNs, which arranges the PLMNs according to their priority levels. In this embodiment, the RPLMN has the highest priority level, and the HPLMN has the next highest priority level.

Among all pairs, the pairs belonging to the RPLMN are determined to be the most important target for network selection. As shown in the lower half of FIG. 4, the scheduling list is rearranged to repeat the first 3 pairs. Specifically, the first pair is repeated after a predetermined number of subsequent pairs or after a predetermined number of times has elapsed, the second pair is repeated after a predetermined number of pairs subsequent to the repeated first pair or after a predetermined number of times has elapsed since the repeated first pair, and the third pair is repeated after a predetermined number of pairs subsequent to the repeated second pair or after a predetermined number of times has elapsed since the repeated second pair. That is, the first 3 pairs will be rescanned every once in a while to increase the chance of obtaining/regaining services from the RPLMN.

Figure 5:
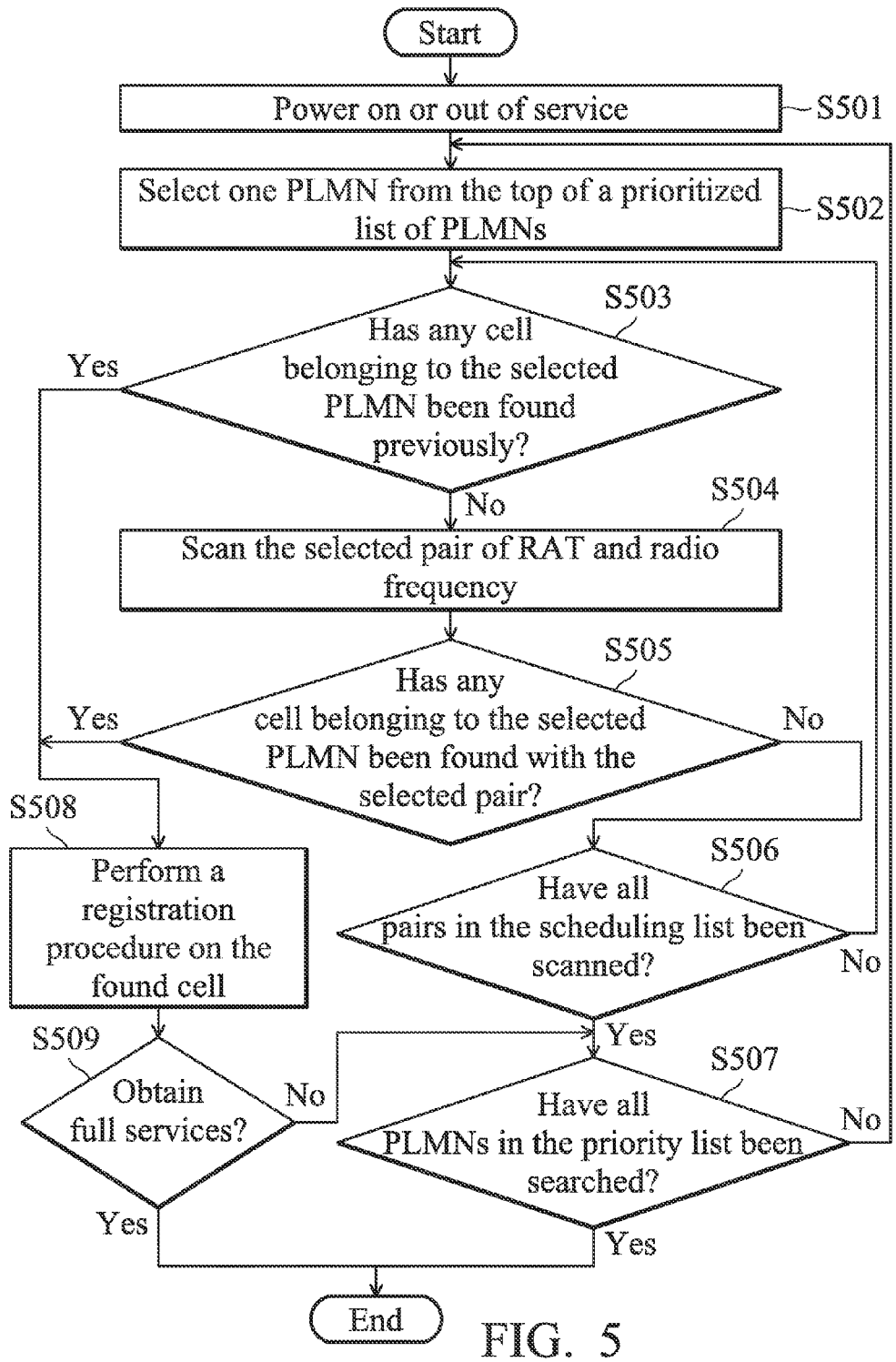
FIG. 5 is a flow chart illustrating the method for network selection by a mobile communication device according to another embodiment of the invention.

FIG. 5 is a flow chart illustrating the method for network selection by a mobile communication device according to another embodiment of the invention. In this embodiment, the mobile communication device is a multi-RAT mobile phone which supports a plurality of RATs and radio frequencies. To begin, the mobile communication device is powered on or detects an out-of-service situation (step S501), and then initiates a PLMN selection procedure. Specifically, during the PLMN selection procedure, the mobile communication device first selects one PLMN from the top of a prioritized list of a plurality of PLMNs (step S502). That is, the PLMN with the highest priority level is selected.

The prioritized list arranges the PLMNs according to their priority levels, wherein the priority levels may be in compliance with the 3rd Generation Partnership Project (3GPP) Technical Specification (TS) 23.122, V8.7.0. For example, the RPLMN or EPLMN may have the first priority level, the HPLMN or Equivalent Home PLMN (EHPLMN) may have the second priority level, the PLMNs in the "User Controlled PLMN selector with Access Technology" data file stored in the subscriber identity card may have the third priority level, the PLMNs in the "Operator Controlled PLMN selector with Access Technology" data file stored in the subscriber identity card may have the fourth priority level, the PLMNs with high received signal quality may have the fifth priority level, and other PLMNs may have the sixth priority level and arranged in descending order of received signal quality.

Next, the mobile communication device determines whether any cell belonging to the selected PLMN has been found previously during the PLMN selection procedure (step S503). If no cell belonging to the selected PLMN has been found previously, the mobile communication device selects one pair of RAT and radio frequency from the top of the scheduling list of a plurality of pairs of RATs and radio frequencies, and then scans the selected pair of RAT and radio frequency (step S504). In another embodiment, when selecting a pair from the scheduling list, the mobile communication device may determine whether one or more of the pairs in the scheduling list belong to a PLMN other than the selected PLMN, and if so, the pairs belonging to a different PLMN are skipped.

Subsequently, the mobile communication device determines whether any cell belonging to the selected PLMN has been found with the selected pair (step S505). If no cell belonging to the selected PLMN has been found with the selected pair, the mobile communication device determines whether all pairs in the scheduling list have been scanned (step S506), and if not, the method returns to step S504. Otherwise, if all pairs in the scheduling list are scanned, the search for the selected PLMN is determined to be complete and the method continues to step S507.

In step S507, the mobile communication device determines whether all PLMNs in the priority list have been searched, and if so, the method ends. Otherwise, if there is any unsearched PLMN in the priority list, the method returns to step S502.

Subsequent to step S505, if a cell belonging to the selected PLMN has been found with the selected pair, the mobile communication device performs a registration procedure on the found cell (step S508), and then determines whether full services can be obtained from the selected PLMN (step S509). If full services can be obtained, the method ends.

Otherwise, if full services cannot be obtained, the method continues to step S507. Please note that the detailed description of the registration procedure is omitted herein since it is beyond the scope of the invention.

Subsequent to step S503, if a cell belonging to the selected PLMN has been found previously, the method continues to step S508.

While the invention has been described by way of example and in terms of preferred embodiment, it is to be understood that the invention is not limited thereto. Those who are skilled in this technology can still make various alterations and modifications without departing from the scope and spirit of this invention. For example, the method of FIGS. 3 and 5 may be implemented in program code stored in a machine-readable storage medium, such as a magnetic tape, semiconductor, magnetic disk, optical disc (e.g., CD-ROM, DVD-ROM, etc.), or others, which is loaded and executed by the Baseband processor of a mobile communication device. Therefore, the scope of the present invention shall be defined and protected by the following claims and their equivalents.

What is claimed is:

1. A mobile communication device supporting a plurality of Radio Access Technologies (RATs) and a plurality of radio frequencies, comprising:
    a Baseband processor configured to schedule the plurality of RATs and the plurality of radio frequencies in pairs in an order for a Public Land Mobile Network (PLMN) selection procedure, and determine one of the pairs and repeat the determined pair in the order of the pairs during the PLMN selection procedure,
    wherein the determined pair is determined according to one of the following features of each of the pairs:
    whether a RAT and a radio frequency of a pair is a serving RAT and a serving frequency;
    whether a RAT and a radio frequency of a pair appears in neighbor information from a System Information Broadcast (SIB) or measurement configuration;
    whether a RAT and a radio frequency of a pair appears in a frequency list from a subscriber identity card coupled in or to the mobile communication device; and
    a priority level of a PLMN to which a RAT and a radio frequency of a pair belong.

2. The mobile communication device of claim 1, wherein the determined pair is repeated during the PLMN selection procedure when a predetermined number of the other pairs have been scanned, or when a predetermined period of time has elapsed since the last repeat of the determined pair.

3. The mobile communication device of claim 1, wherein the PLMN selection procedure is initiated in response to a power-on of the mobile communication device or in response to the mobile communication device being out of service.

4. The mobile communication device of claim 1, wherein the Baseband processor is further configured to determine a list of a plurality of PLMNs, and during the PLMN selection procedure, the PLMNs are selected one at a time from the top of the list and the pairs are scanned in the order with the determined pair repeated therein for each selected PLMN.

5. The mobile communication device of claim 1, wherein, each time one of the PLMNs is selected, the Baseband processor is further configured to determine whether one or more of the pairs in the order belongs to a PLMN other than the selected PLMN, and the one or more of the pairs are skipped during the PLMN selection procedure for the selected PLMN.

6. A method for network selection by a mobile communication device supporting a plurality of Radio Access Technologies (RATs) and a plurality of radio frequencies, comprising:
    scheduling the plurality of RATs and the plurality of radio frequencies in pairs in an order for a Public Land Mobile Network (PLMN) selection procedure; and
    determining one of the pairs and repeating the determined pair in the order of the pairs during the PLMN selection procedure;
    wherein the determined pair is determined according to one of the following features of each of the pairs:
    whether a RAT and a radio frequency of a pair is a serving RAT and a serving frequency;
    whether a RAT and a radio frequency of a pair appears in neighbor information from a System Information Broadcast (SIB) or measurement configuration;
    whether a RAT and a radio frequency of a pair appears in a frequency list from a subscriber identity card coupled in or to the mobile communication device; and
    a priority level of a PLMN to which a RAT and a radio frequency of a pair belong.

7. The method of claim 6, wherein the determined pair is repeated during the PLMN selection procedure when a predetermined number of the other pairs have been scanned, or when a predetermined period of time has elapsed since the last repeat of the determined pair.

8. The method of claim 6, wherein the determined pair is repeated during the PLMN selection procedure when a predetermined number of the other pairs have been scanned, or when a predetermined period of time has elapsed since the last repeat of the determined pair.

9. The method of claim 6, further comprising determining a list of a plurality of PLMNs, wherein during the PLMN selection procedure, the PLMNs are selected one at a time from the top of the list and the pairs are scanned in the order with the determined pair repeated therein for the selected PLMN.

10. The method of claim 9, further comprising: each time one of the PLMNs is selected, determining whether one or more of the pairs in the order belongs to a PLMN other than the selected PLMN, wherein the one or more of the pairs are skipped during the PLMN selection procedure for the selected PLMN.

* * * * *